(12) United States Patent
Yoshikawa et al.

(10) Patent No.: US 12,552,401 B2
(45) Date of Patent: Feb. 17, 2026

(54) VEHICLE CONTROL SYSTEM

(71) Applicant: HONDA MOTOR CO., LTD., Tokyo (JP)

(72) Inventors: Fumiaki Yoshikawa, Tokyo (JP);
Hisanori Yanagida, Tokyo (JP);
Takashi Watanabe, Tokyo (JP);
Satoshi Matsushita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 251 days.

(21) Appl. No.: 18/456,596

(22) Filed: Aug. 28, 2023

(65) Prior Publication Data

US 2024/0067198 A1    Feb. 29, 2024

(30) Foreign Application Priority Data

Aug. 31, 2022 (JP) .................................. 2022-138268

(51) Int. Cl.
*B60W 50/12* (2012.01)
*B60W 30/14* (2006.01)

(52) U.S. Cl.
CPC .......... *B60W 50/12* (2013.01); *B60W 30/143* (2013.01); *B60W 2540/103* (2013.01); *B60W 2540/106* (2013.01)

(58) Field of Classification Search
None
See application file for complete search history.

(56) References Cited

U.S. PATENT DOCUMENTS

| | | | | |
|---|---|---|---|---|
| 10,077,073 B2* | 9/2018 | Allexi | .................... | B60W 50/12 |
| 10,099,688 B2* | 10/2018 | Taki | ...................... | B60W 10/20 |
| 10,415,529 B2* | 9/2019 | Majima | .......... | B60W 30/18018 |
| 10,691,123 B2* | 6/2020 | Abe | .................... | B60W 50/082 |
| 10,807,594 B2* | 10/2020 | Hatano | .............. | B60W 30/085 |
| 11,014,554 B2* | 5/2021 | Ito | ............................. | B60T 7/22 |
| 11,338,799 B2* | 5/2022 | Ike | ........................ | B60W 30/08 |
| 11,429,132 B1* | 8/2022 | Yasuda | .................. | B60K 26/02 |
| 11,433,915 B2* | 9/2022 | Fishwick | .............. | B60W 50/12 |

(Continued)

FOREIGN PATENT DOCUMENTS

| | | | |
|---|---|---|---|
| JP | 2007170232 A | | 7/2007 |
| JP | 2008095635 A | | 4/2008 |

(Continued)

OTHER PUBLICATIONS

Notice of Reasons for Refusal for Japanese Patent Application No. 2022-138268 dated Nov. 14, 2023; 9 pp.

*Primary Examiner* — Jonathan M Dager
(74) *Attorney, Agent, or Firm* — Armstrong Teasdale LLP

(57) ABSTRACT

A vehicle control system for controlling an output of a drive source in a vehicle includes: a drive operation member configured to receive an input regarding a driving force for the vehicle from a driver of the vehicle; and a control device configured to cause the drive source to output a driving force corresponding to the input to the drive operation member. When the control device determines that a predetermined enabling condition is satisfied, the control device enables drive restriction for limiting the output of the drive source. The enabling condition includes an input condition which is based on the input to the drive operation member acquired during a predetermined period before start of the drive source.

12 Claims, 5 Drawing Sheets

(56) References Cited

U.S. PATENT DOCUMENTS

| | | | | |
|---|---|---|---|---|
| 11,518,397 | B2* | 12/2022 | Tochigi | B60W 50/087 |
| 11,577,740 | B2* | 2/2023 | Kwon | G01C 21/3461 |
| 11,597,401 | B2* | 3/2023 | kaminade | B60W 50/087 |
| 11,654,901 | B2* | 5/2023 | Mase | B60W 10/04 |
| | | | | 701/301 |
| 11,787,430 | B2* | 10/2023 | Kim | B60W 50/12 |
| | | | | 701/45 |
| 11,834,061 | B2* | 12/2023 | Chen | B60W 50/082 |
| 11,932,265 | B2* | 3/2024 | Ike | B60W 50/0098 |
| 11,975,730 | B2* | 5/2024 | Takenaka | B60W 50/12 |
| 12,187,303 | B2* | 1/2025 | Fukui | B60W 50/10 |
| 12,311,924 | B2* | 5/2025 | Kakeshita | B60W 50/12 |
| 2005/0075777 | A1* | 4/2005 | Kim | B60W 30/18027 |
| | | | | 340/425.5 |
| 2007/0142169 | A1* | 6/2007 | Marcil | B60Q 5/006 |
| | | | | 477/107 |
| 2008/0095635 | A1 | 4/2008 | Kawakami | |
| 2008/0097677 | A1 | 4/2008 | Kawakami | |
| 2010/0250085 | A1* | 9/2010 | Sugano | B60K 26/021 |
| | | | | 701/70 |
| 2011/0010034 | A1* | 1/2011 | Zagorski | B60W 50/12 |
| | | | | 701/31.4 |
| 2012/0179304 | A1* | 7/2012 | Tokumochi | B60W 50/10 |
| | | | | 701/1 |
| 2012/0191313 | A1* | 7/2012 | Miyahara | B60W 50/087 |
| | | | | 701/70 |
| 2012/0209488 | A1* | 8/2012 | Nagaya | B60W 10/06 |
| | | | | 701/70 |
| 2012/0221209 | A1* | 8/2012 | Tatsukawa | B60W 10/184 |
| | | | | 701/42 |
| 2012/0296542 | A1* | 11/2012 | Nitz | B60K 31/0008 |
| | | | | 701/70 |
| 2013/0018549 | A1* | 1/2013 | Kobana | B60K 28/06 |
| | | | | 701/41 |
| 2013/0041564 | A1* | 2/2013 | Doi | B60W 50/087 |
| | | | | 701/70 |
| 2013/0131945 | A1* | 5/2013 | Kimura | B60W 10/06 |
| | | | | 701/70 |
| 2014/0025267 | A1* | 1/2014 | Tezuka | B60W 30/18027 |
| | | | | 701/51 |
| 2015/0204255 | A1* | 7/2015 | Seguchi | F02D 29/02 |
| | | | | 701/113 |
| 2015/0274179 | A1* | 10/2015 | Inoue | B60T 7/12 |
| | | | | 701/70 |
| 2015/0284000 | A1* | 10/2015 | Hayakawa | B60W 30/188 |
| | | | | 701/70 |
| 2015/0291031 | A1* | 10/2015 | Morimoto | G06V 20/586 |
| | | | | 701/70 |
| 2015/0307091 | A1* | 10/2015 | Gokan | G01S 7/539 |
| | | | | 701/70 |
| 2015/0353093 | A1* | 12/2015 | Pallett | B60W 10/06 |
| | | | | 701/48 |
| 2016/0039409 | A1* | 2/2016 | Hayakawa | G06V 20/586 |
| | | | | 701/70 |
| 2016/0137197 | A1* | 5/2016 | Hayakawa | B60W 30/18154 |
| | | | | 701/70 |
| 2016/0138494 | A1* | 5/2016 | Arikai | B60W 50/0205 |
| | | | | 701/102 |
| 2017/0174211 | A1* | 6/2017 | Mizoguchi | B60W 10/06 |
| 2017/0197506 | A1* | 7/2017 | Inomata | B60W 30/09 |
| 2018/0037235 | A1* | 2/2018 | Otake | B60W 10/18 |
| 2019/0039624 | A1* | 2/2019 | Ike | B60W 50/14 |
| 2019/0122543 | A1* | 4/2019 | Matus | G08G 1/0133 |
| 2019/0256095 | A1* | 8/2019 | Takagi | B60W 50/14 |
| 2019/0315347 | A1* | 10/2019 | Ike | B60W 30/09 |
| 2019/0344802 | A1* | 11/2019 | Yamashita | B60W 50/087 |
| 2020/0156642 | A1* | 5/2020 | Tochigi | B60W 10/04 |
| 2020/0262446 | A1* | 8/2020 | Mayoshi | B60W 50/10 |
| 2020/0263787 | A1* | 8/2020 | Abe | B60W 30/18027 |
| 2020/0369286 | A1* | 11/2020 | Zhang | B60W 40/105 |
| 2021/0039665 | A1* | 2/2021 | Kaminade | B60W 40/08 |
| 2021/0061268 | A1* | 3/2021 | Ike | B60T 8/17558 |
| 2021/0155232 | A1* | 5/2021 | Ike | B60W 10/20 |
| 2021/0197844 | A1* | 7/2021 | Kaminade | B60W 50/0098 |
| 2021/0213942 | A1* | 7/2021 | Kayano | B60W 30/09 |
| 2021/0213967 | A1* | 7/2021 | Tochigi | B60W 50/12 |
| 2021/0213974 | A1* | 7/2021 | Shimbo | G08G 1/165 |
| 2021/0229689 | A1* | 7/2021 | Hashimoto | B60W 50/06 |
| 2021/0261144 | A1* | 8/2021 | Kwon | G01C 21/3679 |
| 2021/0309240 | A1* | 10/2021 | Kim | B60W 50/12 |
| 2021/0323542 | A1* | 10/2021 | Naka | B60K 28/00 |
| 2021/0362715 | A1* | 11/2021 | Kim | B60W 30/188 |
| 2022/0176982 | A1* | 6/2022 | Kakeshita | B60W 50/12 |
| 2023/0141314 | A1* | 5/2023 | Dobashi | B60W 30/143 |
| | | | | 701/23 |
| 2023/0159028 | A1* | 5/2023 | Fukui | B60W 30/0956 |
| | | | | 701/301 |
| 2023/0322211 | A1* | 10/2023 | Yoshikawa | B60W 50/14 |
| | | | | 701/99 |
| 2023/0373472 | A1* | 11/2023 | Watanabe | B60W 30/0956 |

FOREIGN PATENT DOCUMENTS

| | | |
|---|---|---|
| JP | 2015000625 A | 1/2015 |
| JP | 2019044650 A | 3/2019 |
| JP | 2021109598 A | 8/2021 |
| JP | 2021111152 A | 8/2021 |
| JP | 2021112982 A | 8/2021 |
| JP | 2021149246 A | 9/2021 |
| JP | 2022118960 A | 8/2022 |

* cited by examiner

VEHICLE CONTROL SYSTEM

TECHNICAL FIELD

The present disclosure relates to a vehicle control system for controlling a vehicle such as an automobile.

BACKGROUND ART

In recent years, efforts have been made to provide access to sustainable transportation systems that take into account people in vulnerable situations such as the elderly, people with disabilities, and children among transportation participants. To realize this, research and development are actively conducted to further improve the safety and convenience of traffic through development of behavioral stability of vehicles.

JP2008-095635A discloses a driving force control apparatus for suppressing a sudden change of vehicle behavior caused by misapplication of the accelerator pedal. The driving force control apparatus includes an output control unit for controlling an output of a power plant for generating a driving force to drive a vehicle, wherein the output control unit restrains the output of the power plant in a region where the depression amount of the accelerator pedal is equal to or greater than a predetermined value, and relaxes the restraint on the output of the power plant if a predetermined output restraint relaxation condition is satisfied.

By the way, when limiting the output in order to increase the stability of the behavior of the vehicle, there is a problem that it is difficult to determine whether the operation of the accelerator pedal (drive operation member) is intended by the driver or by an error.

For example, in the driving force control apparatus of JP2008-095635A, the output is limited when the depression amount of the accelerator pedal reaches or exceeds a predetermined value. However, when the driver depresses the accelerator pedal for the purpose of accelerating the vehicle, rather than depressing the accelerator pedal by mistake, the vehicle may not be sufficiently accelerated.

In view of the above background, an object of the present invention is to provide a vehicle control system for controlling a driving force of a drive source based on an input to a drive operation member, wherein for a driver who tends to erroneously operate the drive operation member, the driving force can be limited when an input with sudden change is given to the drive operation member after activation (start) of the drive source, whereby the present invention contributes to the development of sustainable transportation systems.

SUMMARY OF THE INVENTION

In order to achieve the above object, one aspect of the present invention provides a vehicle control system (1) for controlling an output of a drive source (25, 25A, 25B) in a vehicle (3), the vehicle control system comprising: a drive operation member (31) configured to receive an input regarding a driving force for the vehicle from a driver of the vehicle; and a control device (21) configured to cause the drive source to output a driving force corresponding to the input to the drive operation member, wherein when the control device determines that a predetermined enabling condition is satisfied, the control device enables drive restriction for limiting the output of the drive source, and the enabling condition includes an input condition which is based on the input to the drive operation member acquired during a predetermined period before start of the drive source.

According to this aspect, when the driver makes an input to the drive operation member before starting the drive source, the drive restriction process for limiting the output of the drive source is started. Therefore, for a driver who tends to operate the drive operation member erroneously, the driving force can be limited appropriately when an input with sudden change is given to the drive operation member after activation of the drive source.

Preferably, the vehicle control system is provided with an accelerator pedal (31) as the drive operation member and an accelerator opening sensor (41) configured to detect a corresponding accelerator opening, and the input condition includes that the accelerator opening obtained by the accelerator opening sensor becomes equal to or greater than a predetermined threshold and/or that a time rate of change of the accelerator opening becomes equal to or greater than a predetermined threshold.

According to this aspect, it is possible to enable the drive restriction for a driver who tends to operate the drive operation member erroneously.

Preferably, the vehicle control system is provided with a terminal (19) capable of transmitting assigned identification information to the control device, the control device is configured to be capable of acquiring the identification information from the terminal before start of operation of the drive source, and the enabling condition includes that the acquired identification information satisfies a predetermined condition.

According to this aspect, the drive restriction is enabled when the driver owns a terminal configured to transmit identification information that satisfies the predetermined condition. Therefore, the safety of the vehicle can be improved by providing a terminal configured to transmit identification information that satisfies the predetermined condition to a driver who tends to operate the drive operation member erroneously. In addition, by providing a terminal configured not to transmit identification information that satisfies the predetermined condition to a driver who is unlikely to make an erroneous operation, it becomes possible to operate the vehicle in line with the driver's intention, thereby enhancing the convenience of the vehicle.

Preferably, the predetermined period is set to a period of time from when electrical equipment (85A, 85B) mounted on the vehicle becomes usable to when the drive source is started.

According to this aspect, it is possible to enable the drive restriction for a driver who tends to operate the drive operation member erroneously.

Preferably, when the drive restriction is enabled, the control device limits the output of the drive source so that a vehicle speed is equal to or lower than a first vehicle speed.

According to this aspect, since the vehicle speed is limited, it is possible to suppress sudden changes in the vehicle behavior.

Preferably, when the control device determines that the enabling condition is satisfied after the drive source is activated, the control device enables the drive restriction to limit the output of the drive source so that a vehicle speed is equal to or lower than a first vehicle speed.

According to this aspect, even after the operation of the drive source is started, it is possible to enable the drive restriction according to the input of the drive operation member. This makes it possible to more reliably suppress sudden changes in the vehicle behavior.

Preferably, when a time for which a state satisfying the enabling condition is maintained during a period before start of operation of the drive source is shorter than a predetermined threshold time, the control device enables the drive restriction to limit the output of the drive source so that the vehicle speed is equal to or lower than a first vehicle speed.

According to this aspect, it is possible to limit the driving force for a driver who operated the drive operation member before the activation of the drive source.

Preferably, when the time for which the state satisfying the enabling condition is maintained during the period before the start of operation of the drive source exceeds the threshold time, the control device enables the drive restriction to limit the output of the drive source so that the vehicle speed is equal to or less than a second vehicle speed that is higher than the first vehicle speed.

When an operation of the drive operation member that satisfies the enabling condition is detected for a threshold time before the start of operation of the drive source, it is considered that the driver has an intention to accelerate. According to this aspect, for a driver who performed an operation of the drive operation member that satisfies the enabling condition for the threshold time before the start of operation of the drive source, namely, for a driver who has an intention to accelerate, the vehicle speed limit during the drive restriction is loosened from the first vehicle speed to the second vehicle speed. Therefore, restriction of the output of the driving force in accordance with the driver's intention can be achieved.

Preferably, the control device enables the drive restriction when the control device determines that the enabling condition is satisfied based on the input to the drive operation member acquired before start of operation of the drive source and the input to the drive operation member acquired after the start of operation of the drive source.

According to this aspect, the drive restriction is enabled based on the input to the drive operation member before the start of operation of the drive source and the input to the drive operation member after the start of operation of the drive source. Therefore, it is possible to restrict the driving force more appropriately in line with the driver's intention.

Preferably, when the control device detects that the input condition is satisfied by the input to the drive operation member before the start of operation of the drive source, and thereafter detects that the input condition is satisfied by the input to the drive operation member after the start of operation of the drive source, the control device enables the drive restriction to limit the output of the drive source so that the vehicle speed is equal to or lower than a first vehicle speed if detection of satisfaction of the input condition after the start of operation of the drive source is after a predetermined time limit from detection of satisfaction of the input condition before the start of operation of the drive source.

According to this aspect, it is possible to enable drive restriction when there is an operation input before and after the activation of the drive source.

Preferably, the control device enables the drive restriction to limit the output of the drive source so that the vehicle speed is equal to or lower than a second vehicle speed that is higher than the first vehicle speed if the detection of satisfaction of the input condition after the start of operation of the drive source is within the predetermined time limit from the detection of satisfaction of the input condition before the start of operation of the drive source.

According to this aspect, the vehicle speed limit is relaxed for a driver who intends to accelerate, and thus, it is possible to limit the output of the driving force in line with the driver's intention.

According to the above configuration, it is possible to provide a vehicle control system for controlling a driving force of a drive source based on an input to a drive operation member, wherein for a driver who tends to erroneously operate the drive operation member, the driving force can be limited when an input with sudden change is given to the drive operation member after the activation of the drive source.

DETAILED DESCRIPTION OF THE INVENTION

In the following, embodiments of the vehicle control system according to the present invention will be described.

First Embodiment

A vehicle control system 1 is provided in a vehicle 3 such as a four-wheeled automobile. Note, however, that the vehicle 3 provided with the vehicle control system 1 is not limited to a four-wheeled automobile, and may be of any type as long as it moves based on the operation performed by the driver (operator).

Figure 1:
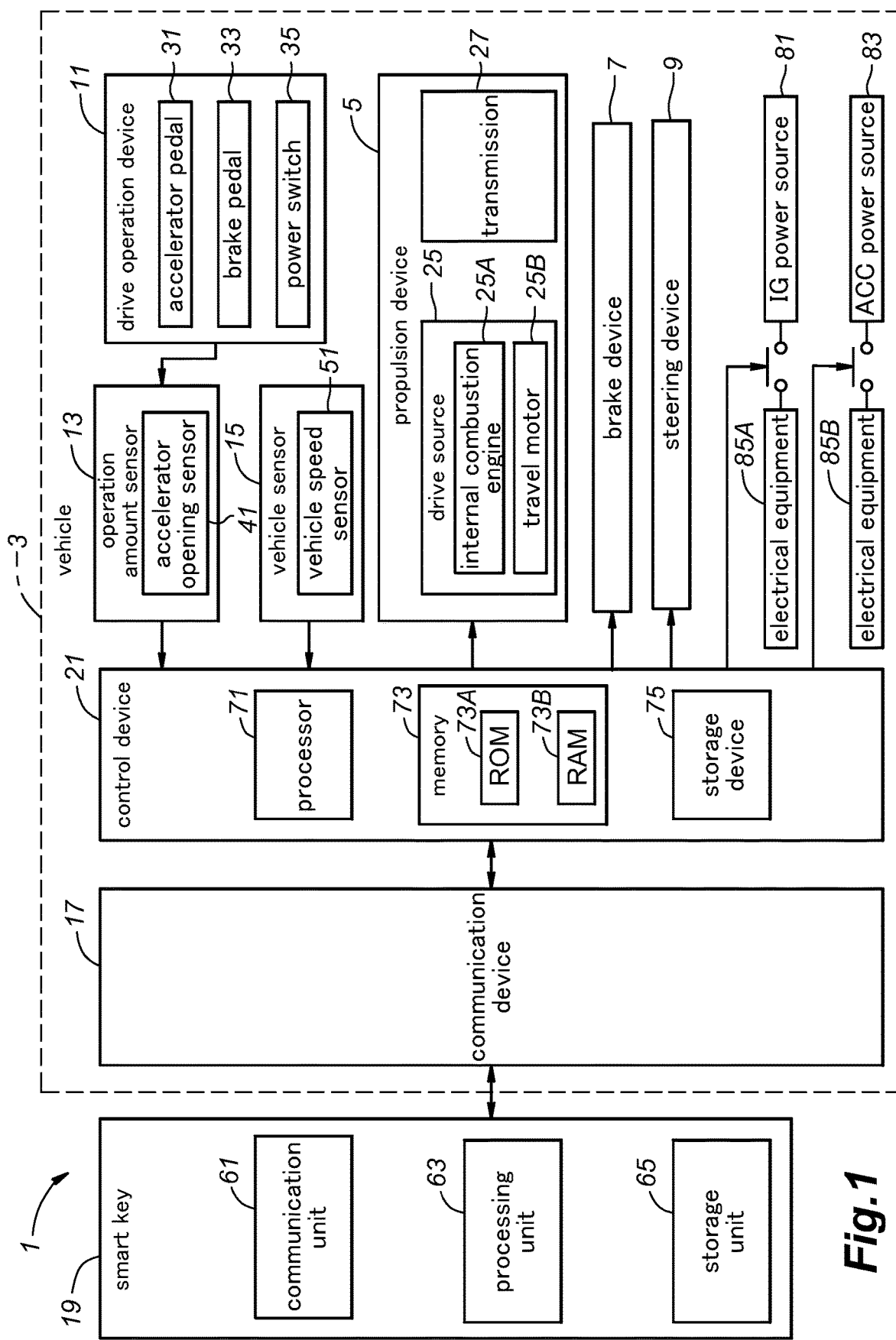
FIG. 1 is a functional block diagram of an embodiment of the vehicle control system according to the present invention.

The vehicle control system 1 controls driving of the vehicle 3. As shown in FIG. 1, the vehicle control system 1 includes a propulsion device 5, a brake device 7, a steering device 9, a drive operation device 11, an operation amount sensor 13, a vehicle sensor 15, a communication device 17, a smart key 19 (terminal), and a control device 21. The propulsion device 5, the brake device 7, the steering device 9, the drive operation device 11, the operation amount sensor 13, the vehicle sensor 15, the communication device 17, and the control device 21 are each mounted on the vehicle 3.

The propulsion device 5 (power system) includes a drive source 25 and a transmission 27, and applies a driving force to the vehicle 3. The drive source 25 includes at least one of an internal combustion engine 25A, such as a gasoline engine or a diesel engine, and a travel motor 25B, and outputs a driving force for causing the vehicle 3 to travel.

The brake device 7 includes, for example, a brake caliper configured to press a pad against a brake rotor and an electric cylinder configured to supply an oil pressure to the brake caliper, and applies a braking force to the vehicle 3. The brake device 7 may include a parking brake device configured to restrict rotation of wheels via wire cables. In the case where the propulsion device 5 includes a travel motor 25B, the brake device 7 may include regenerative braking by the travel motor 25B.

The steering device 9 is a device for changing the steering angle of the wheels, and includes, for example, a rack-and-pinion mechanism configured to steer the wheels and an electric motor configured to drive the rack-and-pinion mechanism.

The drive operation device 11 receives an input operation performed by the driver to control the vehicle 3. The drive operation device 11 includes an accelerator pedal 31 (drive operation member) for receiving an input regarding the driving force for the vehicle 3 from the driver. The drive operation device 11 may include a steering wheel for receiving an input regarding the steering from the driver, a brake pedal 33 for receiving an input regarding the braking force, as well as a shift lever, a parking brake lever, and so on.

The drive operation device 11 further includes a power switch 35 (push start switch). The power switch 35 receives an input for starting the vehicle 3 from the user. The power switch 35 may be a push button type switch provided on an instrument panel. The power switch 35 may also be configured by a button displayed on a touch screen that constitutes a car navigation system, a button displayed on a touch screen provided on a dashboard, or the like.

The operation amount sensor 13 detects an operation amount of the drive operation device 11. The operation amount sensor 13 includes an accelerator opening sensor 41. The accelerator opening sensor 41 detects a depression amount of the accelerator pedal 31, that is, an accelerator opening. The accelerator opening sensor 41 outputs the detected accelerator opening to the control device 21. In addition to the accelerator opening, the accelerator opening sensor 41 may be configured to detect a depression speed of the accelerator pedal 31, that is, a time rate of change of the accelerator opening, and to output the detected depression speed to the control device 21.

The operation amount sensor 13 may include various sensors configured to detect operation amounts of other operation members included in the drive operation device 11. The sensors included in the operation amount sensor 13 preferably output the acquired respective operation amounts to the control device 21.

The vehicle sensor 15 detects a vehicle state. The vehicle sensor 15 includes a vehicle speed sensor 51 configured to detect the speed of vehicle 3. The vehicle sensor 15 may also include an acceleration sensor configured to detect the acceleration of the vehicle 3, a yaw rate sensor configured to detect the angular velocity about a vertical axis of the vehicle 3, a direction sensor configured to detect the direction of the vehicle 3, and the like. The vehicle speed sensor 51 may be, for example, a speedometer sensor configured to generate a pulse signal (hereinafter referred to as a vehicle speed signal) in proportion to the number of revolutions of the axle, or any other known sensor. The vehicle speed sensor 51 outputs the acquired vehicle speed signal to the control device 21.

The communication device 17 is provided in the vehicle 3 and is connected to the control device 21. The communication device 17 mediates wireless communication between the terminal and the control device 21. The communication device 17 may have a receiving antenna for receiving a wireless signal transmitted from the terminal and a transmitting antenna for transmitting a wireless signal to the terminal based on a signal from the control device 21.

The smart key 19 (FOB) is a known terminal that can be carried by the user. The vehicle control system 1 only needs to have at least one smart key 19. That is, the vehicle control system 1 may have only one smart key 19 or may have a plurality of smart keys 19. Each smart key 19 has a communication unit 61 and a processing unit 63. The communication unit 61 is provided with a communication antenna and transmits/receives a wireless signal to/from the control device 21 of the vehicle 3 via the communication device 17. Specifically, the communication unit 61 transmits a wireless signal to the control device 21 based on a signal from the processing unit 63. The signal received by the communication unit 61 is processed by the processing unit 63. Thus, each smart key 19 is configured to be capable of communicating with the control device 21 of the vehicle 3 from outside the vehicle 3. Each smart key 19 is further provided with a storage unit 65. The storage unit 65 stores identification information unique to each smart key 19. In the present embodiment, an identification number unique to each smart key 19 (hereinafter referred to as a key ID) is stored as the identification information.

The smart key 19 may be composed of an FPGA, a communication device, various memories, and the like. Also, the smart key 19 may be configured by a microcomputer including a processor constituting the processing unit 63 and various memories such as a non-volatile memory (ROM) for constituting the storage unit 65. Further, the smart key 19 may be configured by a mobile terminal such as a smartphone, a mobile phone, or a tablet in which a predetermined application is installed.

The control device 21 is an electronic control unit (ECU) including a processor 71 such as a central processing unit (CPU), a memory 73 such as a read-only memory (ROM) 73A and a random access memory (RAM) 73B, and a storage device 75 such as a hard disk drive (HDD) and a solid state drive (SSD).

The control device 21 is configured to be capable of acquiring the operation amount from the operation amount sensor 13 including the accelerator opening sensor 41. The control device 21 transmits a signal to the drive source 25 to control the output of the drive source 25 by executing a predetermined program stored in the memory 73 and/or the storage device 75 based on the acquired operation amount including the accelerator opening. In the present embodiment, the control device 21 is also connected to elements of the propulsion device 5 other than the drive source 25, the brake device 7, and the steering device 9, and is configured to be capable of controlling these devices by transmitting a signal to each of them based on acquired operation amounts. Note that the present invention is not limited to this, and the control device 21 only needs to be configured to be capable of controlling the propulsion device 5 including the drive source 25 at least based on the accelerator opening and/or the time rate of change of the accelerator opening detected by the accelerator opening sensor 41.

In the storage device 75, the key ID and the type of each smart key 19 corresponding to the vehicle 3 in which the control device 21 is mounted are stored to be associated with each other. In the present embodiment, the type of each smart key 19 is one of two types, namely, a type with drive restriction and a type without drive restriction.

The vehicle 3 is provided with at least two onboard power sources, an ignition power source (IG power source) 81 and an accessory power source (ACC power source) 83. The IG power supply 81 is connected to electrical equipment 85A such as wipers, turn signals, etc., which are essential for the travel of the vehicle 3. In the case where the propulsion device 5 includes the internal combustion engine 25A, the IG power supply 81 is connected to a starter motor. The ACC power supply 83 is connected to electrical equipment 85B such as a car navigation system, a car air conditioner, and an audio system. In this embodiment, the control device 21 can turn on/off each of the IG power supply 81 and the ACC power supply 83.

In the vehicle 3 before starting, the control device 21 switches the mode of the vehicle 3 according to the input to the power switch 35.

Modes of the vehicle 3 include an OFF mode, an accessory mode (hereinafter referred to as ACC mode), an ON mode (hereinafter also referred to as IG-ON mode), and a travelable mode.

In the OFF mode, the drive source 25 has not been started, and the IG power supply 81 and the ACC power supply 83 are off. Therefore, all the electrical equipment 85A, 85B cannot be used.

In the ACC mode, the drive source 25 has not been started, the IG power supply 81 is off, and the ACC power supply 83 is on. Therefore, some electrical equipment 85B connected to the ACC power supply 83 can be used.

In the ON mode, both the IG power supply 81 and the ACC power supply 83 are on and all the electrical equipment 85A, 85B can be used, but the drive source 25 has not been started and the vehicle 3 cannot travel.

In the travelable mode, the IG power supply 81 and the ACC power supply 83 are on and all the electrical equipment 85A, 85B can be used, and in addition, the drive source 25 has been started and the vehicle 3 can travel.

For example, in the case where the propulsion device 5 includes the internal combustion engine 25A, in the travelable mode, all the electrical equipment 85A, 85B can be used and the engine has been started (the propulsion device 5 is operating). Therefore, in the case where the propulsion device 5 includes an internal combustion engine, the travelable mode is also referred to as an engine-started mode.

In the case where the propulsion device 5 does not include the internal combustion engine 25A and the vehicle 3 is an electric vehicle, in the travel able mode, all the electrical equipment 85A, 85B can be used and the travel motor 25B has been started (the propulsion device 5 is operating). In the case where the vehicle 3 is an electric vehicle, the travelable mode is also referred to as a Ready mode.

In the state in which the vehicle 3 is in the OFF mode, when the power switch 35 is pressed while the brake pedal 33 is depressed, the control device 21 switches the mode of the vehicle 3 to the accessory mode. After that, in the state in which the vehicle 3 is in the accessory mode, when the power switch 35 is pressed while the brake pedal 33 is depressed, the control device 21 switches the mode of the vehicle 3 to the travelable mode.

However, in the state in which the vehicle 3 is in the accessory mode, when the power switch 35 is pressed without the brake pedal 33 being depressed, the control device 21 switches the mode of the vehicle 3 to the ON mode. In the state in which the vehicle 3 is in the ON mode, when the power switch 35 is pressed while the brake pedal 33 is depressed, the control device 21 switches the mode of the vehicle 3 to the travelable mode.

The control device 21 (more specifically, the processor 71 of the control device 21) determines whether a pre-activation enabling condition is satisfied during a period from when the mode of the vehicle 3 is switched to the ON mode (a state in which all the electrical equipment 85A, 85B can be used but the drive source 25 has not been started) to when the mode of the vehicle 3 is switched to the travelable mode (a state in which all the electrical equipment 85A, 85B can be used and the drive source 25 has been started). If the pre-activation enabling condition is satisfied, the control device 21 enables drive restriction. When the drive restriction is enabled, the control device 21 limits the output of the drive source 25 after the drive source 25 is started.

Details of the determination process will be described below with reference to the flowchart of FIG. 2. Note that when the vehicle 3 stops driving, the drive restriction is disabled, and the drive restriction is maintained disabled to when the mode of the vehicle 3 is switched to the ON mode. In other words, the drive restriction is disabled before the determination process is started.

In the first step ST1 of the determination process, the control device 21 determines whether the type of the smart key 19 held by the driver is with drive restriction based on the key ID of the smart key 19. In step ST1, the control device 21 may acquire the key ID of the smart key 19 near the driver's seat as the key ID of the smart key 19 held by the driver. Further, the control device 21 may acquire the key ID of the smart key 19 before the mode of the vehicle 3 becomes the ON mode (for example, when the door is opened and closed). If the type of the smart key 19 is not with drive restriction, the control device 21 ends the determination process, and if the type of the smart key 19 is with drive restriction, the control device 21 executes step ST2.

In step ST2, the control device 21 determines whether the mode of the vehicle 3 is the travelable mode, that is, whether the drive source 25 has been started. If the drive source 25 has been started, the control device 21 ends the determination process. The control device 21 executes step ST3 if the drive source 25 has not been started.

In step ST3, the control device 21 determines whether the operation input to the accelerator pedal 31 satisfies the input condition. In this embodiment, the control device 21 acquires the accelerator opening obtained by the accelerator opening sensor 41, and determines that the input condition is satisfied when the accelerator opening exceeds a predetermined threshold (opening threshold). When the input condition is satisfied, the control device 21 determines that the pre-activation enabling condition is satisfied, and enables the drive restriction in step ST4 before ending the determination process. If the accelerator opening does not exceed the predetermine threshold, the control device 21 returns to step ST2 and determines again whether the mode of the vehicle 3 is the travelable mode.

Figure 2:
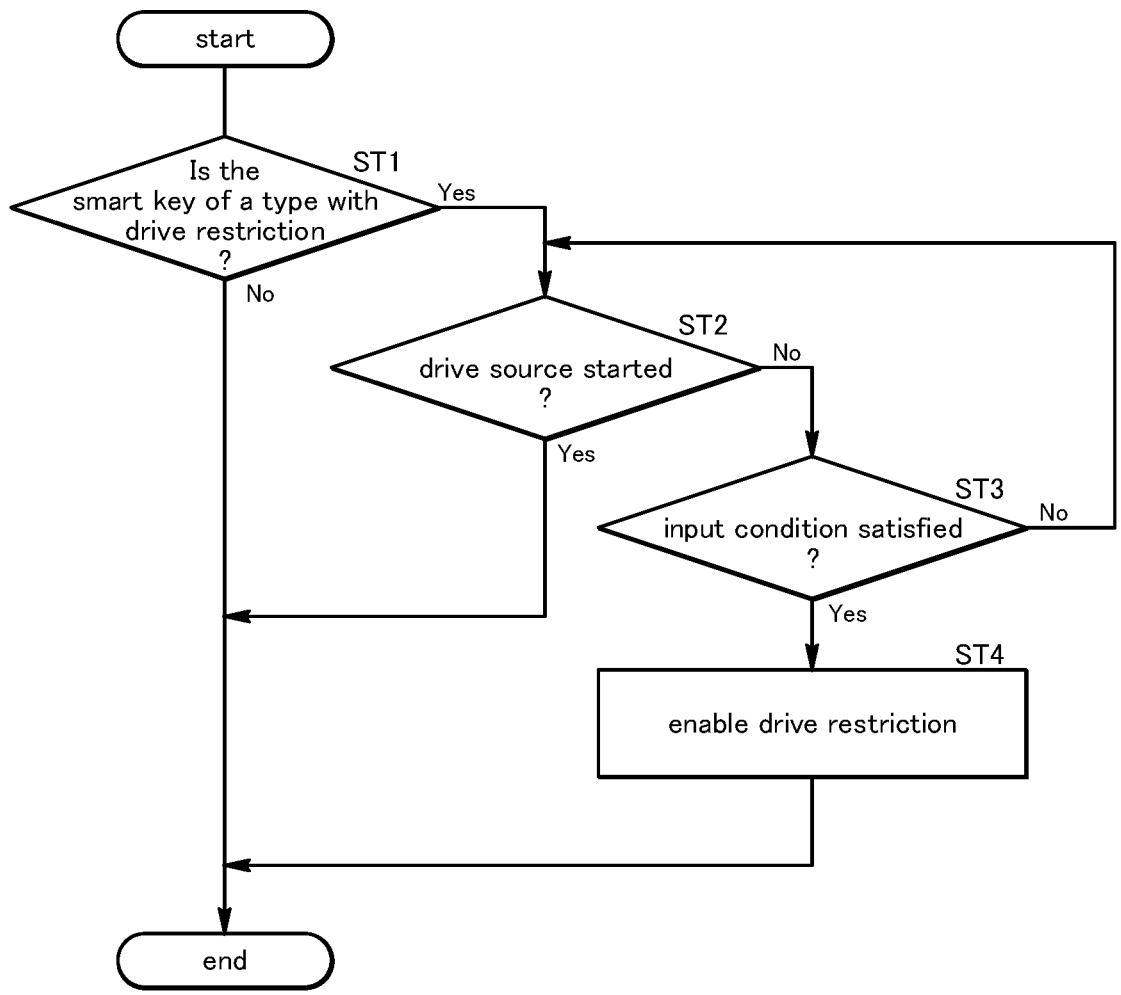
FIG. 2 is a flowchart showing a determination process of the vehicle control system according to the first embodiment.

That is, as can be understood from the flowchart of FIG. 2, the pre-activation enabling condition for enabling the drive restriction includes: that the type of the smart key 19 held by the driver is with drive restriction (Condition 1), and that the accelerator opening exceeds a predetermined threshold (opening threshold) (Condition 2). The control device 21 enables the drive restriction when both Condition 1 and Condition 2 are satisfied, that is, when the pre-activation enabling condition is satisfied during the period from when the mode of the vehicle 3 is switched to the ON mode to when the mode of the vehicle 3 is switched to the travelable mode.

It can be said that Condition 1 is that the smart key 19 held by the driver is of a type with drive restriction, namely, that the drive restriction is not prohibited. Condition 1 can be said to be a permission condition (or prohibition condition) based on the smart key 19. Condition 2 corresponds to an input condition related to the operation input to the accelerator pedal 31.

The pre-activation enabling condition is not limited to the above, and for example, may include, as Condition 3, that the time rate of change of the accelerator opening obtained by the accelerator opening sensor 41 is equal to or greater than a predetermined threshold (hereinafter referred to as the rate of change threshold). Like Condition 2, Condition 3 also corresponds to the input condition related to the operation input to the accelerator pedal 31.

In this case, the control device 21 determines that the pre-activation enabling condition is satisfied when both Conditions 1 and 2 are satisfied or when both Conditions 1 and 3 are satisfied. Accordingly, the control device 21 determines that the pre-activation enabling condition is satisfied and enables the drive restriction. Alternatively, the control device 21 may determine that the input condition is satisfied when Condition 2 and Condition 3 are satisfied. That is, the control device 21 may be configured to determine that the pre-activation enabling condition is satisfied and to enable the drive restriction when all three Conditions 1, 2, and 3 are satisfied.

After the start of operation of the drive source 25, the control device 21 acquires the accelerator opening obtained by the accelerator opening sensor 41 and causes the drive source 25 to output a driving force corresponding to the obtained accelerator opening. However, when the drive restriction is enabled, the control device 21 limits the driving force output from the drive source 25 compared to when the drive restriction is not enabled. As a result, even when the accelerator opening is the same, the driving force output from the drive source 25 when the drive restriction is enabled is limited to be equal to or less than the driving force output from the drive source 25 when the drive restriction is not enabled.

In this embodiment, when the drive restriction is enabled, the control device 21 acquires a vehicle speed signal from the vehicle speed sensor 51, detects the vehicle speed, and controls the output of the driving force so that the vehicle speed is equal to or lower than a first vehicle speed. The first vehicle speed is preferably set to the speed of the vehicle 3 due to creep phenomenon (creep speed). The first vehicle speed may be, for example, any value from 5 to 10 km/h.

The control device 21 may be configured to cancel the drive restriction when a predetermined cancellation condition is satisfied. The cancellation condition may be, for example, that a predetermined period of time has elapsed since the drive restriction was enabled. Alternatively, the cancellation condition may be that the state in which there is no operation input to the accelerator pedal 31 (or the accelerator opening is less than a predetermined threshold) is maintained for a predetermined time after the drive restriction was enabled. Also, the cancellation condition may include an operation of the shift lever, an operation input to a predetermined cancellation button, or the like.

Next, the effects of the vehicle control system 1 configured as above will be described.

The switching of the mode of the vehicle 3 from the ON mode to the travelable mode is performed in response to pressing of the power switch 35 on the condition that the brake pedal 33 is depressed, and thus, does not require depressing of the accelerator pedal 31. Therefore, it can be inferred that the driver tends to depress the accelerator pedal 31 and the brake pedal 33 erroneously when depressing of the accelerator pedal 31 is detected during the period from when the mode of the vehicle 3 is switched to the ON mode to when the drive source 25 is activated.

In the vehicle control system 1 according to the present invention, if the pre-activation enabling condition is satisfied before the activation of the drive source 25, the vehicle speed is limited to the first vehicle speed or less after the activation of the drive source 25. That is, when the type of the smart key 19 near the driver's seat is with drive restriction and the accelerator opening becomes equal to or greater than the opening threshold (or the time rate of change of the accelerator opening becomes equal to or greater than the rate of change threshold) before the activation of the drive source 25, the vehicle speed is limited to the first vehicle speed or less.

In other words, if the driver who owns a smart key 19 with drive restriction depresses the accelerator pedal 31 to such a degree that the accelerator opening becomes equal to or greater than the opening threshold value (or to such a degree that the time rate of change of the accelerator opening becomes equal to or greater than the rate of change threshold) during the period from when the mode of the vehicle 3 is switched to the ON mode to when the drive source 25 is activated, the vehicle speed is limited to the first vehicle speed or less.

Thereby, for a driver who tends to depress the accelerator pedal 31 and the brake pedal 33 erroneously, the vehicle speed of the vehicle 3 driven by the driver can be limited after the activation of the drive source 25. Therefore, it is possible to limit the vehicle speed without being affected by a delay caused by the process of determining whether the depression of the accelerator pedal 31 is an erroneous operation (for example, determining whether the accelerator opening is equal to or greater than a predetermined threshold value). Thus, even when there is an input accompanied by a sudden change to the accelerator pedal 31 after the activation of the drive source 25, the driving force can be appropriately limited. As a result, the driving force can be appropriately limited when the driver erroneously depresses the accelerator pedal 31, and the safety of the vehicle 3 can be further enhanced.

This will further improve traffic safety and thus can provide access to sustainable transport systems that take into account people in vulnerable situations. Therefore, the present invention contributes to the development of sustainable transportation systems.

The drive restriction is enabled when the driver owns a smart key 19 with drive restriction. Therefore, the safety of the vehicle 3 can be enhanced by having a user who tends to perform an erroneous operation own a smart key 19 with drive restriction. In addition, by having a user who is unlikely to perform an erroneous operation own a smart key 19 without drive restriction, it is possible for the user to operate the vehicle 3 according to the user's intention, whereby the convenience of the vehicle 3 can be enhanced.

Second Embodiment

The vehicle control system 1 according to the second embodiment differs from the first embodiment in that the control device 21 can enable the drive restriction even after the activation of the drive source 25, and the other configuration is the same as in the first embodiment. Therefore, the point different from the first embodiment, that is, the feature that the control device 21 can enable the drive restriction even after the activation of the drive source 25, will be described in detail in the following, and the description of the other configuration will be omitted.

The control device 21 (specifically, the processor 71) according to the second embodiment determines whether a post-activation enabling condition is satisfied after the activation of the drive source 25, and enables the drive restriction when the post-activation enabling condition is satisfied.

The post-activation enabling condition may be the same as the pre-activation enabling condition. That is, the post-activation enabling condition includes Conditions 1 and 2, and the control device 21 enables the drive restriction when both Conditions 1 and 2 are satisfied after the activation of the drive source 25.

Figure 3:
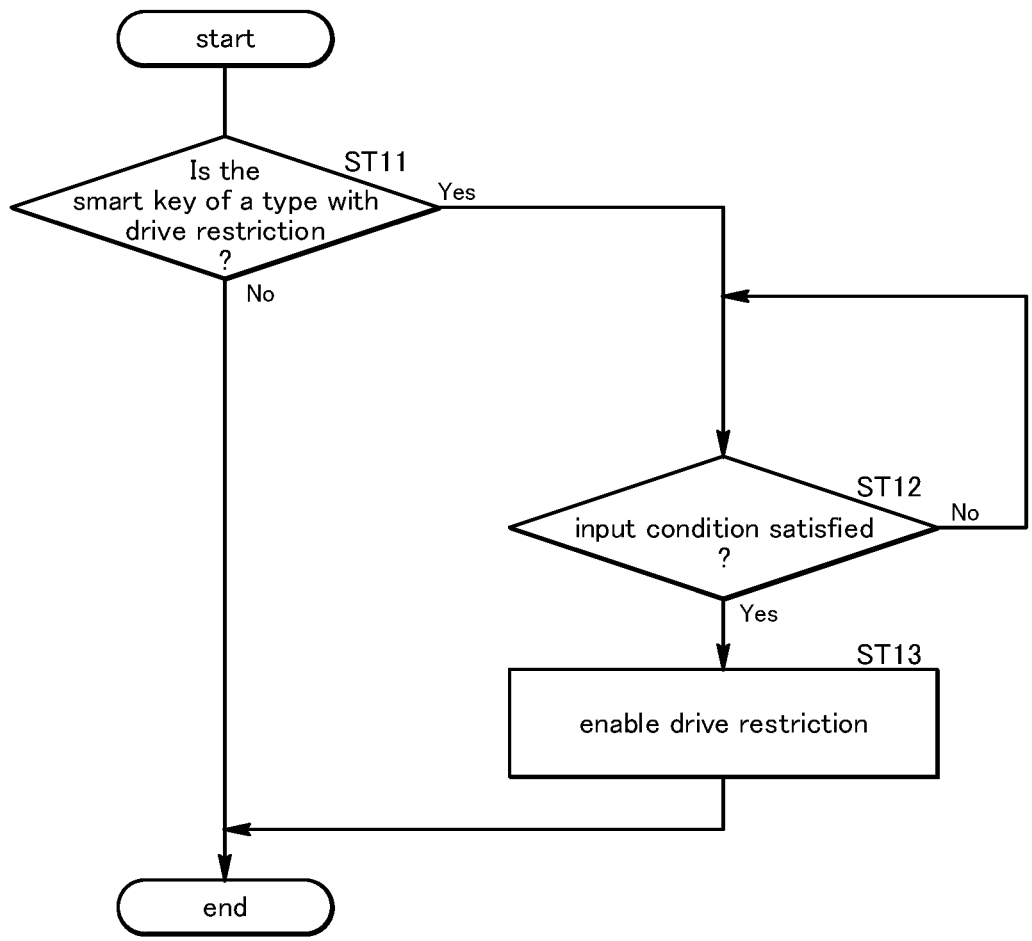
FIG. 3 is a flowchart showing a determination process of the vehicle control system according to the second embodiment.

In this embodiment, the control device 21 is configured to execute the determination process shown in the flowchart of FIG. 3 after the activation of the drive source 25. As shown in the flowchart of FIG. 3, in the first step ST11 of the determination process, the key ID of the smart key 19 located near the driver's seat is acquired, and it is determined whether the type of the smart key 19 is with drive restriction (whether Condition 1 is satisfied). If the type of the smart key 19 is not with drive restriction, the control device 21 ends the determination process, and if the type of the smart key 19 is with drive restriction, the control device 21 executes step ST12.

In step ST12, the control device 21 determines whether the input condition is satisfied. In this embodiment, the control device 21 determines that the input condition is satisfied when Condition 2 is satisfied, that is, when the accelerator opening exceeds the opening threshold. Note, however, that in step ST12, the control device 21 may determine that the input condition is satisfied when Condition 3 is satisfied (that is, when the time rate of change of the accelerator opening is equal to or greater than the rate of change threshold). Further, the control device 21 may determine that the input condition is satisfied when Condition 2 or Condition 3 is satisfied, or may determine that the input condition is satisfied when Condition 2 and Condition 3 are satisfied.

When the input condition is satisfied (the accelerator opening exceeds the opening threshold), the control device 21 enables the drive restriction in step ST13 and ends the determination process. When the input condition is not satisfied (the accelerator opening does not exceed the opening threshold), the control device 21 returns to step ST12 and determines again whether the input condition is satisfied. Thereby, the control device 21 enables the drive restriction when both Condition 1 and Condition 2 are satisfied after the activation of the drive source 25.

After the activation of the drive source 25, when the drive restriction is enabled, the control device 21 limits the output of the driving force so that the vehicle speed is equal to or lower than the first vehicle speed, as in the first embodiment.

Next, the effects of the vehicle control system 1 configured in this manner will be described.

Even after the drive source 25 is activated (or starts operating), the vehicle speed can be limited when the accelerator pedal 31 is depressed to such an extent that the accelerator opening becomes equal to or greater than the opening threshold (and/or the time rate of change of the accelerator opening (that is, the depression speed of the accelerator pedal) becomes equal to or greater than the change rate threshold). Thereby, even after the drive source 25 starts operating, when the driver strongly depresses the accelerator pedal 31 erroneously, it is possible to suppress abrupt change of the behavior of the vehicle 3, thereby improving the safety of the vehicle 3.

Third Embodiment

The vehicle control system 1 according to the third embodiment differs from the first embodiment in that when the pre-activation enabling condition is satisfied, the drive restriction to be executed after the activation of the drive source 25 is set according to the input to the accelerator pedal 31 before the start of operation of the drive source 25 (more specifically, from when the mode is switched to the ON mode to when the mode is switched to the travelable mode).

Figure 4:
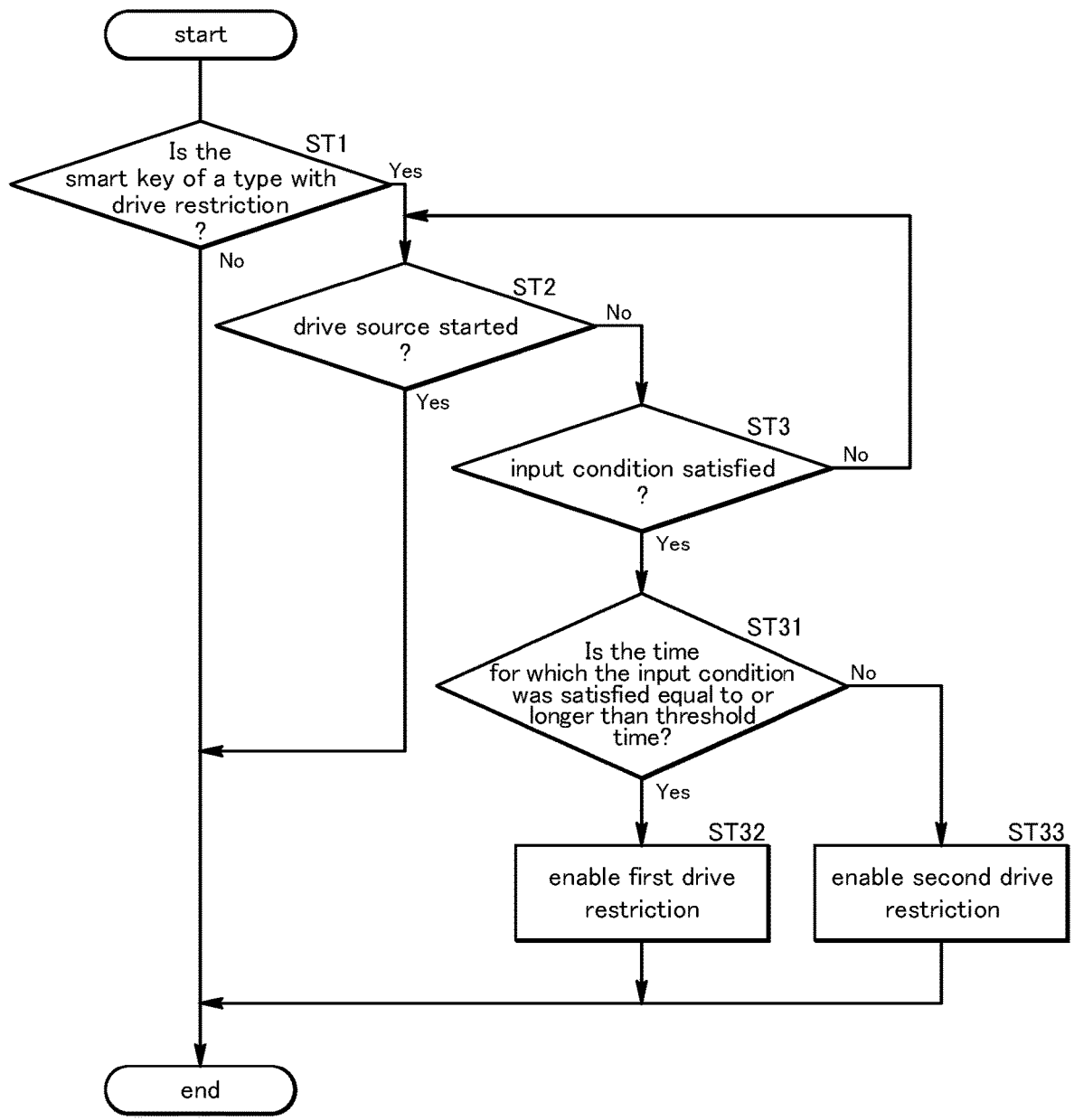
FIG. 4 is a flowchart showing a determination process of the vehicle control system according to the third embodiment.

FIG. 4 shows a flowchart of the determination process of the vehicle control system 1 according to the third embodiment. As shown in FIG. 4, the third embodiment differs from the first embodiment in that steps ST31, ST32, and ST33 are provided after step ST3 of the determination process. The other configuration is the same as in the first embodiment, and thus, the description of the other configuration is omitted.

As shown in FIG. 4, as in the first embodiment, the control device 21 (specifically, the processor 71) determines in step ST3 whether the input condition is satisfied (for example, whether the accelerator opening is equal to or greater than the opening threshold) before the start of operation of the drive source 25. When the input condition is satisfied, the control device 21 executes step ST31. When the input condition is not satisfied, the control device 21 executes step ST2.

In step ST31, the control device 21 determines whether the time for which the input condition was satisfied (for example, the time for which the accelerator opening was equal to or greater than the opening threshold) is equal to or longer than a predetermined threshold time.

When the time for which the input condition was satisfied exceeds the threshold time, the control device 21 executes step ST32, in which the control device 21 determines that the pre-activation enabling condition is satisfied and enables first drive restriction. When the time for which the input condition was satisfied is equal to or less than the threshold time, the control device 21 executes step ST33, in which the control device 21 determines that the pre-activation enabling condition is satisfied and enables second drive restriction.

After the activation of the drive source 25, in the case where the first drive restriction is enabled, the control device 21 limits the driving force of the drive source 25 so that the vehicle speed is equal to or lower than a second vehicle speed that is higher than the first vehicle speed. On the other hand, in the case where the second drive restriction is enabled after the activation of the drive source 25, the control device 21 limits the driving force of the drive source 25 so that the vehicle speed is equal to or lower than the first vehicle speed.

The second vehicle speed may be, for example, approximately 30 km/h. Also, the second vehicle speed may be set to monotonically increase from the first vehicle speed to reach a predetermined value (e.g., 30 km/h) after the start of operation of the drive source 25.

As in the second embodiment, when the pre-activation enabling condition is not satisfied from when the mode of the vehicle 3 is switched to the ON mode to when the drive source 25 is started and the post-activation enabling condition is satisfied after the start of the drive source 25, the control device 21 may limit the driving force of the drive source 25 so that the vehicle speed is equal to or lower than the first vehicle speed.

Next, the effects of the vehicle control system 1 configured in this manner will be described.

The control device 21 enables the second drive restriction when the time for which the input condition is satisfied is less than the threshold time. As a result, the driving force is limited so that the vehicle speed is equal to or lower than the first vehicle speed.

On the other hand, the control device 21 enables the first drive restriction when the time for which the input condition is satisfied is equal to or longer than the threshold time. As a result, the vehicle speed is limited to the second vehicle speed or less, and the vehicle speed is allowed to become higher than the first vehicle speed. That is, the control device 21 compares the time for which the input condition is satisfied with the threshold time, and switches the drive restriction based on the comparison result.

If the time for which the input condition is satisfied (for example, the time for which the accelerator opening is maintained equal to or greater than the opening threshold) from when the mode is switched to the ON mode to when the mode is switched to the travelable mode, namely, before the start (before the start of operation) of the drive source 25, is equal to or greater than the threshold time, it is inferred that the driver has an intention to accelerate. Therefore, compared to the case where the time for which the input condition is satisfied is less than the threshold time, the vehicle speed restriction is loosened by limiting the vehicle speed to be equal to or lower than the second vehicle speed, which is higher than the first vehicle speed. Thereby, control of the vehicle 3 more in accordance with the driver's intention becomes possible.

Fourth Embodiment

The vehicle control system 1 according to the fourth embodiment differs from the first embodiment with respect to the determination process executed by the control device 21, and the other configuration is the same as in the first embodiment, so the description of the other configuration will be omitted. In the vehicle control system 1 according to the fourth embodiment, the control device 21 determines whether the enabling condition is satisfied based on the accelerator opening acquired before the start of operation of the drive source 25 (in this embodiment, from when the mode is switched to the ON mode to when the mode is switched to the travelable mode) and the accelerator opening acquired after the start of operation of the drive source 25, and performs the drive restriction.

Figure 5:
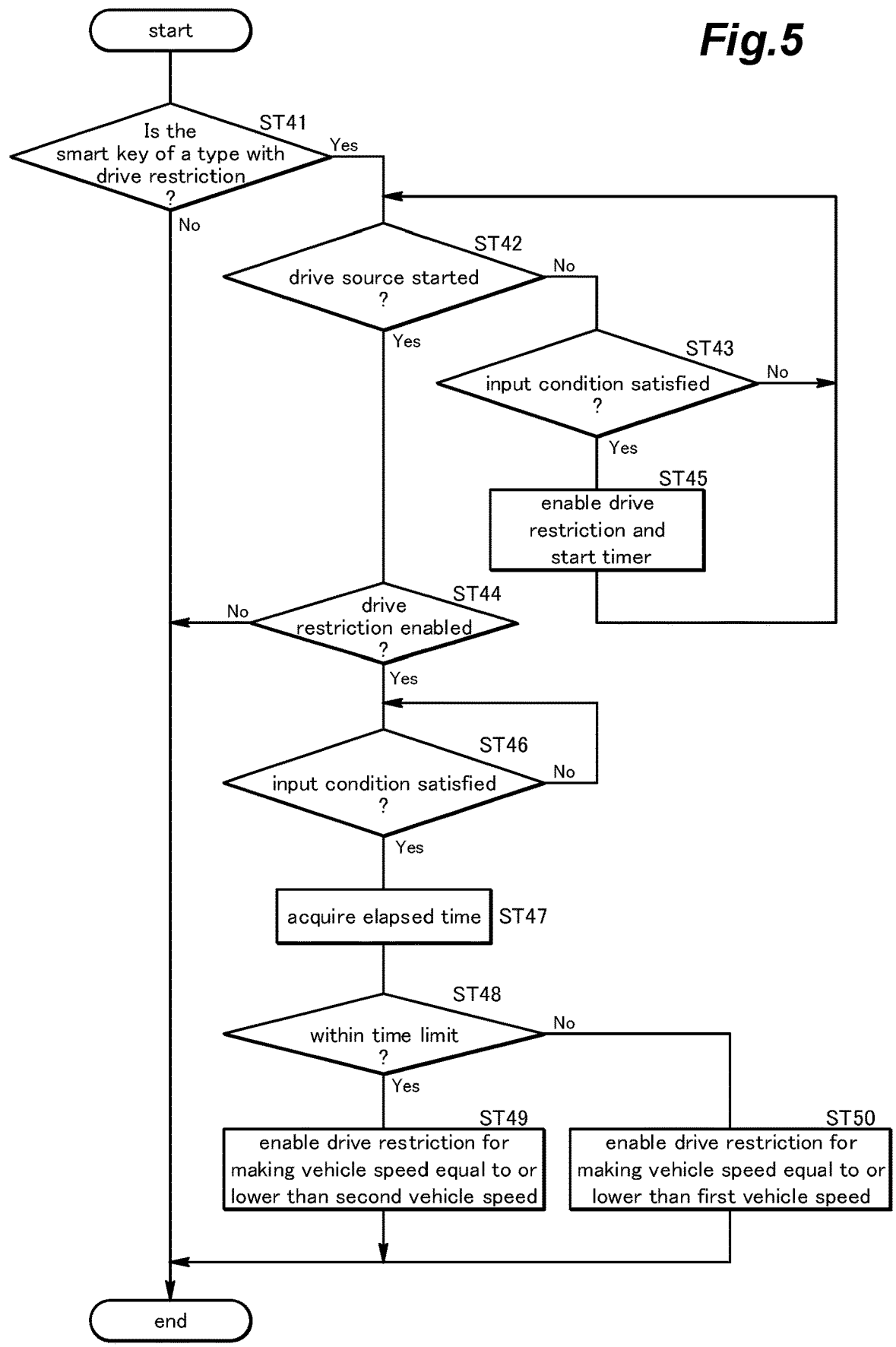
FIG. 5 is a flowchart showing a determination process of the vehicle control system according to the fourth embodiment.

FIG. 5 shows a flowchart of the determination process executed by the control device 21 of the vehicle control system 1 according to the fourth embodiment. The control device 21 starts the determination process when the mode of the vehicle 3 becomes the ON mode.

In the first step ST41 of the determination process, the control device 21 (more specifically, the processor 71) determines whether the type of the smart key 19 is with drive restriction, as in the first embodiment. If the type of the smart key 19 is with drive restriction, the control device 21 executes step ST42, and if the type of the smart key 19 is without drive restriction, the control device 21 ends the determination process.

In step ST42, the control device 21 determines whether the mode of the vehicle 3 is the travelable mode, that is, whether the drive source 25 has been started. The control device 21 executes step ST43 if the drive source 25 has not been started, and executes step ST44 if the drive source 25 has been started.

In step ST43, the control device 21 determines whether the input condition is satisfied. In this embodiment, the control device 21 determines that the input condition is satisfied when Condition 2 is satisfied, that is, when the accelerator opening is equal to or greater than the opening threshold. When the input condition is satisfied, that is, when the accelerator opening is equal to or greater than the opening threshold, the control device 21 executes step ST45, and when the input condition is not satisfied, that is, when the accelerator opening is less than the opening threshold, the control device 21 executes step ST42.

In step ST44, the control device 21 determines whether the drive restriction is enabled. If the drive restriction is not enabled, the control device 21 ends the determination process, and if the drive restriction is enabled, the control device executes step ST46.

In step ST45, the control device 21 enables the drive restriction and starts a timer. When the start of the timer is completed, the control device 21 executes step ST42 again. Note that, in step ST44, when the drive restriction has already been enabled, the control device 21 preferably maintains the drive restriction and restarts the timer.

In step ST46, the control device 21 determines whether the input condition is satisfied, that is, whether the accelerator opening is equal to or greater than the opening threshold. When the input condition is satisfied, that is, when the accelerator opening is equal to or greater than the opening threshold, the control device 21 executes step ST47, and when the input condition is not satisfied, that is, when the accelerator opening is less than the opening threshold, the control device executes step ST46 again.

In step ST47, the control device 21 acquires an elapsed time from when the timer was started. The elapsed time corresponds to the time from when the accelerator opening became equal to or greater than the opening threshold before the start of the drive source 25 to when the accelerator opening became equal to or greater than the opening threshold again after the start of the drive source 25. After acquiring the elapsed time, the control device 21 executes step ST48.

In step ST48, the control device 21 determines whether the elapsed time is within a predetermined time limit. The control device 21 executes step ST49 if the elapsed time is within the time limit, and executes step ST50 if the elapsed time is longer than the time limit.

In step ST49, the control device 21 enables drive restriction (first drive restriction) for making the vehicle speed equal to or lower than the second vehicle speed, and ends the determination process.

In step ST50, the control device 21 enables drive restriction (second drive restriction) for making the vehicle speed equal to or lower than the first vehicle speed, and ends the determination process.

The second vehicle speed is higher than the first vehicle speed, and the second vehicle speed and the first vehicle speed are set similarly to the third embodiment. Specifically, the first vehicle speed is preferably set to the speed of the vehicle 3 due to creep phenomenon (creep speed), and may be any value from 5 to 10 km/h, for example. The second vehicle speed may be, for example, about 30 km/h, and may be set to monotonically increase from the first vehicle speed to reach a predetermined value (for example, 30 km/h) after the start of operation of the drive source 25.

Note that, in step ST43 and/or step ST46, the control device 21 may determine that the input condition is satisfied when the time rate of change of the accelerator opening (that is, the depression speed of the accelerator pedal 31) is equal to or greater than the change rate opening threshold (that is, when Condition 3 is satisfied). Also, in step ST43 and/or step ST46, the control device 21 may determine that the input condition is satisfied when Condition 2 and/or Condition 3 is satisfied.

Next, the effects of the vehicle control system 1 configured in this manner will be described.

The control device 21 determines that the enabling condition is satisfied and performs the drive restriction when the following three conditions are satisfied: (Condition A) that the input condition is satisfied (the accelerator opening becomes equal to or greater than the opening threshold) before the start of operation of the drive source 25 (Yes in ST43); (Condition B) that the type of the smart key 19 held by the driver is with drive restriction (Yes in ST41); and (Condition C) that the input condition is satisfied (the accelerator opening becomes equal to or greater than the threshold value) after the activation of the drive source 25 (Yes in ST46).

Further, the control device 21 sets the content of the drive restriction based on the elapsed time from when the accelerator opening became equal to or greater than the opening threshold before the start of operation of the drive source 25 to when the accelerator opening became equal to or greater than the opening threshold after the start of the drive source 25.

Specifically, in the case where the elapsed time from when the accelerator opening became equal to or greater than the opening threshold before the start of operation of the drive source 25 to when the accelerator opening became equal to or greater than the opening threshold after the start of the drive source 25 is within a predetermined time limit, the control device 21 performs the drive restriction so that the vehicle speed is equal to or lower than the second vehicle speed (ST49).

On the other hand, in the case where the time from when the accelerator opening became equal to or greater than the opening threshold before the start of operation of the drive source 25 to when the accelerator opening became equal to or greater than the opening threshold after the start of the drive source 25 is longer than the time limit, the control device 21 performs the drive restriction so that the vehicle speed is equal to or lower than the first vehicle speed (ST50).

In this way, when the driver depresses the accelerator pedal 31 to such an extent that the accelerator opening exceeds the opening threshold before the activation of the drive source 25, releases the accelerator pedal 31, activates the drive source 25, and thereafter depresses the accelerator pedal 31 to such an extent that the accelerator opening exceeds the opening threshold, the drive restriction is executed.

When the driver depresses the accelerator pedal 31 to such an extent that the input condition is satisfied (in this embodiment, the accelerator opening exceeds the opening threshold) before the activation of the drive source 25 and then depresses the accelerator pedal 31 again to such an extent that the input condition is satisfied after the activation of the drive source 25 and before the time limit, it is considered that the driver has an intention to accelerate the vehicle 3 more quickly.

When the driver depresses the accelerator pedal 31 to such an extent that the input condition is satisfied before the activation of the drive source 25 and then depresses the accelerator pedal 31 again to such an extent that the input condition is satisfied after the activation of the drive source 25 but after the time limit has elapsed (No in ST48), the vehicle speed is limited to the first vehicle speed. On the other hand, when the driver depresses the accelerator pedal 31 to such an extent that the input condition is satisfied before the activation of the drive source 25 and then depresses the accelerator pedal 31 again to such an extent that the input condition is satisfied after the activation of the drive source 25 and before the time limit (Yes in ST48), the vehicle speed is limited to the second vehicle speed, which is higher than the first vehicle speed. Thus, when the accelerator pedal 31 is depressed again after the activation of the drive source 25 and before the time limit, the vehicle speed limit is relaxed compared to when the accelerator pedal 31 is depressed again after the activation of the drive source 25 and after the time limit. Therefore, the vehicle speed limit is relaxed for a driver who intends to accelerate, and thus, it is possible to limit the output of the driving force in line with the driver's intention.

Thus, in the vehicle control system 1 according to the fourth embodiment, since the drive restriction is performed based on the input to the accelerator pedal 31 (for example, accelerator opening) before the start of operation of the drive source 25 and the input to the accelerator pedal 31 after the start of operation of the drive source 25, it is possible to control the behavior of the vehicle 3 more in line with the tendency and intention of the driver.

Concrete embodiments of the present invention have been described in the foregoing but the present invention can be modified in various ways without being limited to the above embodiments.

In the first embodiment described above, the control device 21 was configured to enable the drive restriction based on the operation input of the accelerator pedal 31 acquired during the period from when the mode of the vehicle 3 is switched to the ON mode to when the mode of the vehicle 3 is switched to the travelable mode, that is, during the period after the electrical equipment 85A, 85B mounted on the vehicle 3 becomes usable and before the drive source 25 is started, but the present invention is not limited to this.

The control device 21 may be configured in other ways as long as it enables the drive restriction based on the operation input of the accelerator pedal 31 acquired during a predetermined period before the start of the drive source 25. For example, the control device 21 may perform the drive restriction based on the operation input of the accelerator pedal 31 from when the mode of the vehicle 3 is switched to the ACC mode to when the mode of the vehicle 3 is switched to the travelable mode. Besides, the control device 21 may be configured to enable the drive restriction based on the operation input of the accelerator pedal 31 acquired during the period from when the door is unlocked to when the drive source 25 is started.

In addition, the control device 21 may perform the drive restriction based on the operation input of the accelerator pedal 31 during the period from the ON mode until the shift lever is switched from the P range to the D range or the R range in the travelable mode.

In the above embodiment, drive restriction was performed to limit the vehicle speed, but it is not limited to this mode. For example, the driving force output from the drive source 25 may be restricted. Also, at the same time as the drive restriction, the control device 21 may issue a warning by means of sound, light, or the like. In addition, the control device 21 may turn on a warning light on the meter panel provided in front of the driver's seat or may display a warning on an appropriate liquid crystal display when the drive restriction is enabled and/or when the drive restriction is performed.

Also, the drive restriction may be a mode in which the operation of the shift lever is restricted (e.g., a predetermined operation is required to switch the shift lever to the D range or the R range) in the travelable mode.

In the second embodiment described above, the drive restriction is enabled when the input condition is satisfied (the accelerator opening becomes equal to or greater than the opening threshold) in ST12 after the start of the drive source 25. However, configuration may be made such that the drive restriction is enabled when the input condition is satisfied in step ST12 and the vehicle speed is equal to or lower than a predetermined threshold value (for example, 30 km/h).

The vehicle control system 1 may be provided with only one smart key 19 or may be provided with a plurality of smart keys 19. Each smart key 19 is configured to be capable of transmitting a predetermined wireless signal, and the control device 21 may determine that the permission condition is satisfied when the wireless signal is received with a predetermined intensity or higher.

The smart key 19 may have a button or the like for locking/unlocking the doors of the vehicle 3. Also, the smart key 19 may be constituted of a mobile terminal (for example, a smartphone or the like) owned by the user and having a predetermined application installed. The smart key 19 may be composed of multiple terminals. For example, the smart key 19 may be composed of a first key for enabling drive restriction and a second key having other functions such as locking/unlocking the doors of the vehicle 3. In this case, the control device 21 may determine that the permission condition is satisfied when a signal (permission signal) having a predetermined intensity or higher is received from the first key, and determine that the permission condition is not satisfied when the permission signal cannot be received from the first key.

The invention claimed is:

1. A vehicle control system for controlling an output of a drive source in a vehicle, the vehicle control system comprising:
    a drive operation member configured to receive an input regarding a driving force for the vehicle from a driver of the vehicle; and
    a control device configured to cause the drive source to output a driving force corresponding to the input to the drive operation member,
    wherein when the control device determines that a predetermined enabling condition is satisfied, the control device enables drive restriction for limiting the output of the drive source,
    the enabling condition includes an input condition which is based on the input to the drive operation member acquired during a predetermined period before start of the drive source, and
    wherein the predetermined period is set to a period of time from when electrical equipment mounted on the vehicle becomes usable to when the drive source is started.

2. The vehicle control system according to claim 1, wherein the vehicle control system is provided with an accelerator pedal as the drive operation member and an accelerator opening sensor configured to detect a corresponding accelerator opening, and
    the input condition includes that the accelerator opening obtained by the accelerator opening sensor becomes equal to or greater than a predetermined threshold and/or that a time rate of change of the accelerator opening becomes equal to or greater than a predetermined threshold.

3. The vehicle control system according to claim 2, wherein the vehicle control system is provided with a terminal capable of transmitting assigned identification information to the control device,
    the control device is configured to be capable of acquiring the identification information from the terminal before start of operation of the drive source, and
    the enabling condition includes that the acquired identification information satisfies a predetermined condition.

4. The vehicle control system according to claim 1, wherein when the drive restriction is enabled, the control device limits the output of the drive source so that a vehicle speed is equal to or lower than a first vehicle speed.

5. The vehicle control system according to claim 1, wherein when the control device determines that the enabling condition is satisfied after the drive source is activated, the control device enables the drive restriction to limit the output of the drive source so that a vehicle speed is equal to or lower than a first vehicle speed.

6. The vehicle control system according to claim 1, wherein when a time for which a state satisfying the enabling condition is maintained during a period before start of operation of the drive source is shorter than a predetermined threshold time, the control device enables the drive restriction to limit the output of the drive source so that the vehicle speed is equal to or lower than a first vehicle speed.

7. The vehicle control system according to claim 6, wherein when the time for which the state satisfying the enabling condition is maintained during the period before the start of operation of the drive source exceeds the threshold time, the control device enables the drive restriction to limit the output of the drive source so that the vehicle speed is equal to or less than a second vehicle speed that is higher than the first vehicle speed.

8. The vehicle control system according to claim 1, wherein the control device enables the drive restriction when the control device determines that the enabling condition is satisfied based on the input to the drive operation member acquired before start of operation of the drive source and the input to the drive operation member acquired after the start of operation of the drive source.

9. The vehicle control system according to claim 8, wherein when the control device detects that the input condition is satisfied by the input to the drive operation member before the start of operation of the drive source, and thereafter detects that the input condition is satisfied by the input to the drive operation member after the start of operation of the drive source, the control device enables the drive restriction to limit the output of the drive source so that the vehicle speed is equal to or lower than a first vehicle speed if detection of satisfaction of the input condition after the start of operation of the drive source is after a predetermined time limit from detection of satisfaction of the input condition before the start of operation of the drive source.

10. The vehicle control system according to claim 9, wherein the control device enables the drive restriction to limit the output of the drive source so that the vehicle speed is equal to or lower than a second vehicle speed that is higher than the first vehicle speed if the detection of satisfaction of the input condition after the start of operation of the drive source is within the predetermined time limit from the detection of satisfaction of the input condition before the start of operation of the drive source.

11. A vehicle control system for controlling an output of a drive source in a vehicle, the vehicle control system comprising:
    a drive operation member configured to receive an input regarding a driving force for the vehicle from a driver of the vehicle; and
    a control device configured to cause the drive source to output a driving force corresponding to the input to the drive operation member,
    wherein when the control device determines that a predetermined enabling condition is satisfied, the control device enables drive restriction for limiting the output of the drive source, the enabling condition includes an input condition which is based on the input to the drive operation member acquired during a predetermined period before start of the drive source, and wherein when a time for which a state satisfying the enabling condition is maintained during a period before start of operation of the drive source is shorter than a predetermined threshold time, the control device enables the drive restriction to limit the output of the drive source so that the vehicle speed is equal to or lower than a first vehicle speed.

12. A vehicle control system for controlling an output of a drive source in a vehicle, the vehicle control system comprising:

a drive operation member configured to receive an input regarding a driving force for the vehicle from a driver of the vehicle; and a control device configured to cause the drive source to output a driving force corresponding to the input to the drive operation member, wherein when the control device determines that a predetermined enabling condition is satisfied, the control device enables drive restriction for limiting the output of the drive source, the enabling condition includes an input condition which is based on the input to the drive operation member acquired during a predetermined period before start of the drive source, wherein the control device enables the drive restriction when the control device determines that the enabling condition is satisfied based on the input to the drive operation member acquired before start of operation of the drive source and the input to the drive operation member acquired after the start of operation of the drive source, and wherein when the control device detects that the input condition is satisfied by the input to the drive operation member before the start of operation of the drive source, and thereafter detects that the input condition is satisfied by the input to the drive operation member after the start of operation of the drive source, the control device enables the drive restriction to limit the output of the drive source so that the vehicle speed is equal to or lower than a first vehicle speed if detection of satisfaction of the input condition after the start of operation of the drive source is after a predetermined time limit from detection of satisfaction of the input condition before the start of operation of the drive source.

* * * * *